US010972823B2

(12) United States Patent
Chou et al.

(10) Patent No.: US 10,972,823 B2
(45) **Date of Patent: *Apr. 6, 2021**

(54) IN-EAR HEADPHONES WITH AN ERGONOMIC CUSHION AND AN ERGONOMIC CUSHION THEREOF

(71) Applicant: Kingston Technology Corp., Fountain Valley, CA (US)

(72) Inventors: Peter Leekuo Chou, Brea, CA (US); Baron King Lee, Irvine, CA (US); Wei-Min Liang, Hsinchu (TW); Pen Hao Ma, Taoyuan (TW)

(73) Assignee: Kingston Technology Corp., Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,364

(22) Filed: Oct. 28, 2019

(65) Prior Publication Data

US 2020/0068283 A1 Feb. 27, 2020

Related U.S. Application Data

(63) Continuation-in-part of application No. 15/833,987, filed on Dec. 6, 2017, now Pat. No. 10,462,549.

(60) Provisional application No. 62/432,466, filed on Dec. 9, 2016.

(51) Int. Cl.
*H04R 1/10* (2006.01)
*H04R 25/00* (2006.01)

(52) U.S. Cl.
CPC ......... *H04R 1/1016* (2013.01); *H04R 1/1025* (2013.01); *H04R 1/1041* (2013.01); *H04R 1/1058* (2013.01); *H04R 1/1075* (2013.01); *H04R 25/652* (2013.01); *H04R 2420/07* (2013.01); *H04R 2460/15* (2013.01)

(58) Field of Classification Search
CPC .. H04R 1/1016; H04R 1/1058; H04R 1/1075; H04R 25/652; H04R 25/658; H04R 2225/023; H04R 2225/025; H04R 2499/11; H04R 2460/15
USPC .............. 381/71.6, 322, 325, 328, 329, 380; 181/130, 135
See application file for complete search history.

(56) References Cited

U.S. PATENT DOCUMENTS

| | | | | |
|---|---|---|---|---|
| 8,121,325 | B2 * | 2/2012 | Atamaniuk .......... | H04R 25/652 381/322 |
| 8,989,426 | B2 * | 3/2015 | Silvestri .................... | H04R 1/10 381/380 |
| 10,462,549 | B2 * | 10/2019 | Chou .................. | H04R 25/652 |

(Continued)

*Primary Examiner* — Huyen D Le

(74) *Attorney, Agent, or Firm* — Law Offices of S.J. Christine Yang

(57) ABSTRACT

The present invention is directed to a headphone or an earpiece that includes a cushion that advantageously allows for improved comfort, sound quality, and stability in the ear. The cushion includes an inner cavity, an ear-canal aperture and a tip portion, wherein the inner cavity of the cushion accommodates a nozzle portion of a housing within the cavity, and the axis of the inner cavity is substantially parallel to the first axis, and wherein the ear-canal aperture opens toward the ear canal of the user's ear when the headphone or the earpiece is worn by the user. A speaker element is positioned inside the nozzle portion of the housing, and the center of mass of the headphone is shifted close to a center plane of the cushion.

13 Claims, 17 Drawing Sheets

(56) References Cited

U.S. PATENT DOCUMENTS

| | | | | |
|---|---|---|---|---|
| 2008/0002835 | A1* | 1/2008 | Sapiejewski ......... | H04R 1/2849 381/71.6 |
| 2011/0123059 | A1* | 5/2011 | Hu ....................... | H04R 1/1016 381/380 |

* cited by examiner

IN-EAR HEADPHONES WITH AN ERGONOMIC CUSHION AND AN ERGONOMIC CUSHION THEREOF

The present application is a continuation-in-part of U.S. patent application Ser. No. 15/833,987 filed on Dec. 6, 2017, which claims priority to the U.S. Provisional Patent Application No. 62/432,466 filed on Dec. 9, 2016, each of which are incorporated herein by reference in their entirety. The present application is related to co-pending U.S. patent application Ser. No. 16/587,707 filed on Sep. 30, 2019, which is incorporated herein by reference in its entirety.

BACKGROUND OF THE INVENTION

Field of the Invention

The present invention relates generally to headphones, and, more specifically, to headphones that have compact profiles and include in-ear headphones, ear-buds or ear-sets including an ergonomic cushion generally designed to be worn in a user's concha and configured to provide comfort, while reducing or avoiding unintended dislodging of the headphones.

Discussion of the Related Art

Headphones have miniature speakers to deliver sound and to allow a user to listen to an audio source privately. Headphones can also be used to provide audio from a portable or mobile device to a user. With the wider adoption of mobile devices, headphones use also is growing. In addition, with the increased audio applications provided by the mobile devices, the time duration of headphones wear also is increasing. Therefore, what is needed is a headphone that provides a user's superb audio experience, while offering enhanced comfort even during long hours of wear.

A headphone typically is worn in or around a user's ear. FIG. 1 is an illustration of certain anatomy parts of a human outer ear according to the related art. As illustrated in FIG. 1, the helix is the prominent rim of a human outer ear. The human outer ear also includes the antihelix, which is a curved promience of cartilage generally parallel with and in front of the helix. The antihelix forms a "Y"-like shape. The depression in the "fork" of the "Y"-like shape formed by the antihelix is referred to as the fossa triangularis. The "upper" parts of the 'Y"-like shape formed by the antihelix are referred to as "crus antihelicis superioris" (illustrated to be the right of the fossa triangularis in FIG. 1) and "crus antihelicis inferioris" (illustrated to be the left of the fossa triangularis in FIG. 1). The depression or the groove between the helix and the antihelix is the scapha.

The concha is the hollow or the space between the anterior portion of the antihelix and is divided by the crus helix into the cymba above and the cavum below. The cymba conche is the narrowest end of the concha. The cavum conchae is the larger bowl-shaped hollow or space in front of the ear canal (not shown). The human outer ear also includes the tragus, which is a small pointed eminence and is situated in front of the cavum conchae. Just above the lobus auriculae or the earlobe, the human outer ear includes the antitragus. The tragus and the antitragus are separated by the incisura intertragica or the intertragic notch. The inventors focus on fitting a headphone within a user's cavum conchae region. An example of this cavum conchae region is illustrated with a shaded region in FIG. 1.

SUMMARY OF THE INVENTION

Accordingly, embodiments of the invention are directed to headphones that substantially obviate one or more of the problems due to limitations and disadvantages of the related art.

An object of embodiments of the invention is to provide headphones that offer comfortable wear and superb audio effects.

Another object of embodiments of the invention is to provide headphones that provide lasting comfort during long hours of wear.

Yet, another object of embodiments of the invention is to provide headphones that are lightweight, comfortable and durable, while providing tight seal to a user's ear.

Another object of embodiments of the invention is to provide headphones that have a compact profile.

Another object of embodiments of the invention is to provide headphones that have a center of mass at or close to a nozzle portion of the headphones.

An object of embodiments of the invention is to provide headphones that offer enhanced audio effects. The headphones preferably are worn into or out of a user's ear along an axis that is substantially perpendicular to the axis of the cushion's body center plane, and the headphone speaker diaphragm-vibrating axis preferably substantially parallel to the headphone sound exit axis.

Another object of embodiments of the invention is to provide cushions for headphones to ensure the headphones are worn properly and the way it should be. This way, a user can avoid raising the volume levels and still can enjoy the audio or music without endangering the user's hearing.

An object of embodiments of the invention is to provide cushions for headphones to guide the wear of the headphones. The cushion includes a body center plane. The headphones preferably are worn into or out of a user's ear along an axis that is substantially perpendicular to the axis of the cushion's body center plane.

Another object of embodiments of the invention is to shift a center of mass of headphones toward a nozzle portion of a housing. The center of mass of headphones are shifted to be close to a user's ear canal when the headphones are worn. Shifting the headphones' center of mass further reduces unintended dislodging of the headphones.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, an earpiece device includes a housing, the housing including a first chamber and a nozzle portion, wherein the nozzle portion extends along a first axis and extends toward an ear canal of a user's ear when the earpiece device is worn by the user, an acoustic driver for converting applied audio signals to acoustic energy, wherein the acoustic driver includes a diaphragm, wherein the acoustic driver is located substantially within the nozzle portion, wherein the acoustic driver is acoustically coupled to the first chamber of the housing, and wherein a vibrating axis of the diaphragm is substantially parallel to the first axis, a cushion, the cushion including an inner cavity, an ear-canal aperture and a tip portion, wherein the inner cavity of the cushion accommodates the nozzle portion within the cavity, and the axis of the inner cavity is substantially parallel to the first axis, wherein the ear-canal aperture opens toward the ear canal of the user's ear when the earpiece device is worn by the user, and wherein the tip portion engages the concha of the user's ear when the earpiece device is worn by the user, and the axis of the tip portion is not parallel to the first axis.

Also, to achieve these and other advantages and in accordance with the purpose of embodiments of the invention, as embodied and broadly described, an earpiece device includes a sound delivery housing, the sound delivery housing including a first chamber and a nozzle portion, wherein the nozzle portion extends along the first axis and extends toward an ear canal of a user's ear when the earpiece device is worn by the user, wherein the first chamber is substantially parallel to a first axis, wherein the nozzle portion accommodates an acoustic driver therein, and a removable eartip, the removable eartip including an inner cavity, an ear-canal aperture and a tip portion, wherein the inner cavity of the eartip accommodates the nozzle portion within the cavity, and the axis of the inner cavity is substantially parallel to the first axis, wherein the ear-canal aperture opens toward the ear canal of the user's ear when the earpiece device is worn by the user, and wherein the tip portion engages the concha of the user's ear when the earpiece device is worn by the user, and the axis of the tip portion is not parallel to the first axis.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the preferred embodiments of the invention, examples of which are illustrated in the accompanying drawings.

Figure 1:
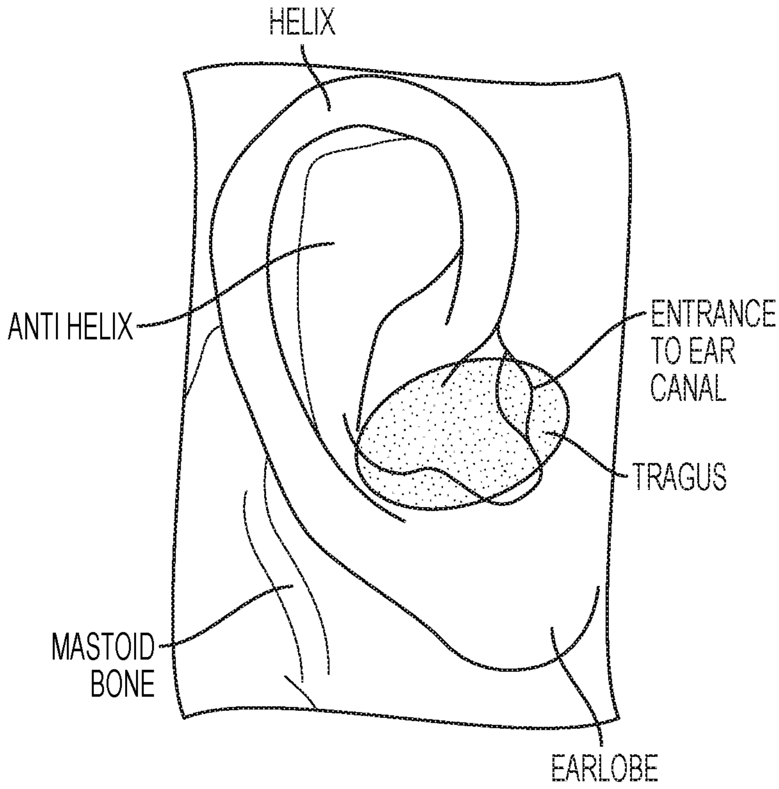
Figure 1 RELATED ART
FIG. 1 is an illustration of certain anatomy parts of a human outer ear according to the related art.
Figure 2:
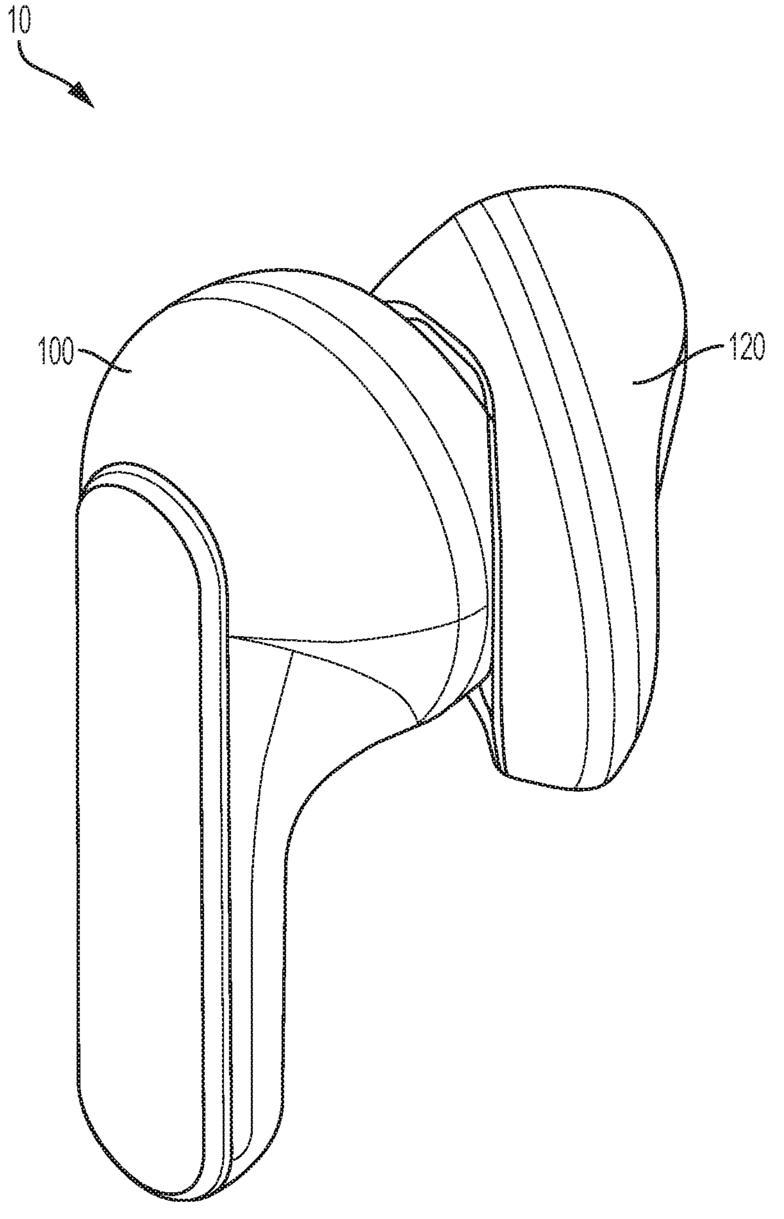
FIG. 2 is a side perspective view of a headphone according to an embodiment of the present invention.

FIG. 2 is a side perspective view of a headphone according to an embodiment of the present invention. As illustrated in FIG. 2, a headphone 10 includes a housing 100. The housing 100 can hold miniature speakers. For example, the housing 100 can include a cavity to accommodate drivers, transducer, receivers and receiver elements (not shown) inside of the housing 100. The drivers, transducers, receivers and receiver elements together can form one or more miniature speakers. The housing 100 includes a nozzle portion that extends from the main body of the housing 100 along a first axis for extending toward an ear canal of a user (not shown) when the headphone is worn by the user.

The headphone 10 also includes a cushion 120. The cushion 120 preferably has an ergonomic exterior shape. The exterior shape of the cushion 120 is designed to be fitted within the cavum conchae region of a user's ear (not shown) when the headphone is worn by the user. The cushion 120 is configured to provide comfort to a user when wearing the headphone 10. In addition, the cushion 120 is configured to secure the wearing of the headphone 10 by a user.

The cushion 120 includes an inner cavity along its main body. The inner cavity of the cushion 120 can accommodate the nozzle portion of the housing 100 therein. The cushion 120 also includes an ear-canal aperture opening toward the ear canal of a user (not shown).

Figure 3A:
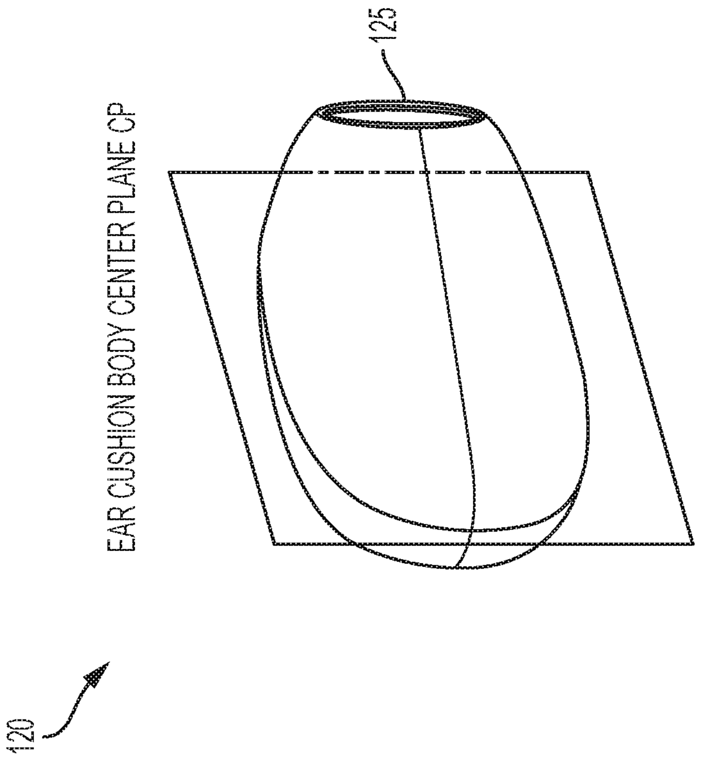
FIGS. 3A and 3B are illustrations of the headphone cushion shown in FIG. 2.
Figure 3B:
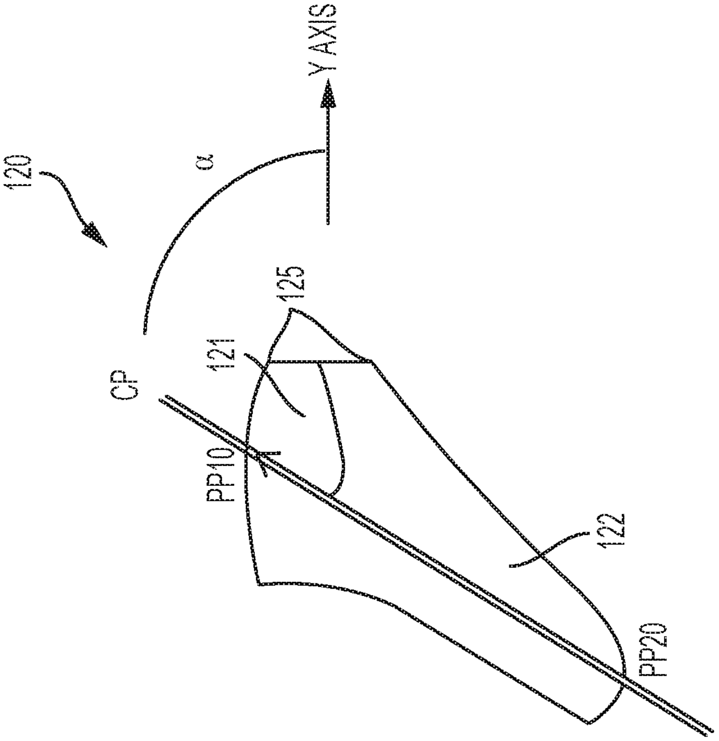

FIGS. 3A and 3B are illustrations of the headphone cushion shown in FIG. 2. As illustrated in FIG. 3A, the cushion 120 preferably has an ergonomic exterior shape. A center plane CP may be visualized along the body of the cushion 120. The center plane CP preferably is across the widest span of the cushion 120.

As illustrated in FIG. 3B, one end of the widest span of the illusory center plane CP is shown with a first point PP10, and the opposed end of the widest span of the center plane CP is shown with a second point PP20. The distance (L) between the first and second points PP10 and PP20 of the cushion 120 preferably is between 15.0 mm to 28.0 mm.

The exterior shape of the cushion 120 is designed to be fitted within the concha of a user's ear (not shown) when the headphone is worn by the user. The distance (L) between the first and second points PP10 and PP20 of the cushion 120 approximates or corresponds to a length of the cavum conchae of a user's ear (not shown). As further explained later, the first and second points PP10 and PP20 can correspond to two separate pressure points onto a user's cavum conchae, when a headphone with the cushion 120 is worn by the user.

The cushion 120 includes a cushion main body portion 121 and a cushion tip portion 122. The cushion main body portion 121 also includes an inner cavity that can accommodate the nozzle portion of the housing (not shown) therein.

One end of the inner cavity may provide the opening to receive the nozzle portion (not explicitly shown) of the housing. At another end, the inner cavity of the cushion 120 connects to an ear-canal aperture 125. The ear-canal aperture 125 is at a first end of the cushion main body portion 121. The ear-canal aperture 125 opens at the first end toward the ear canal of a user's ear, when the headphone is worn by the user.

If the inner cavity provides a space through the cushion main body portion 121 along AXIS Y, the cushion tip portion 122 would extend from the cushion main body portion 121 at an angle α from AXIS Y. For example, the illusory center plane CP substantially aligns with the direction the cushion tip portion 122 extending from the cushion main body portion 121. The first point PP10 is on the exterior surface of the cushion main body portion 121 along the illusory center plane CP. The second point PP20 is on the exterior surface of the cushion tip portion 122 along the illusory center plane CP. The angle α is between 65 to 40 degrees. More generally, the angle α may be between 80 to 30 degrees.

The cushion 120 is configured to provide comfort to a user when wearing the headphone. For example, the exterior of the cushion 120 may be formed of silicon rubber material. The hardness of the selected exterior silicon rubber material preferably is with durometer from 40 Shore OO to 35 Shore A and coefficient of friction ranging from 0.10 to 1.0.

Figure 4A:
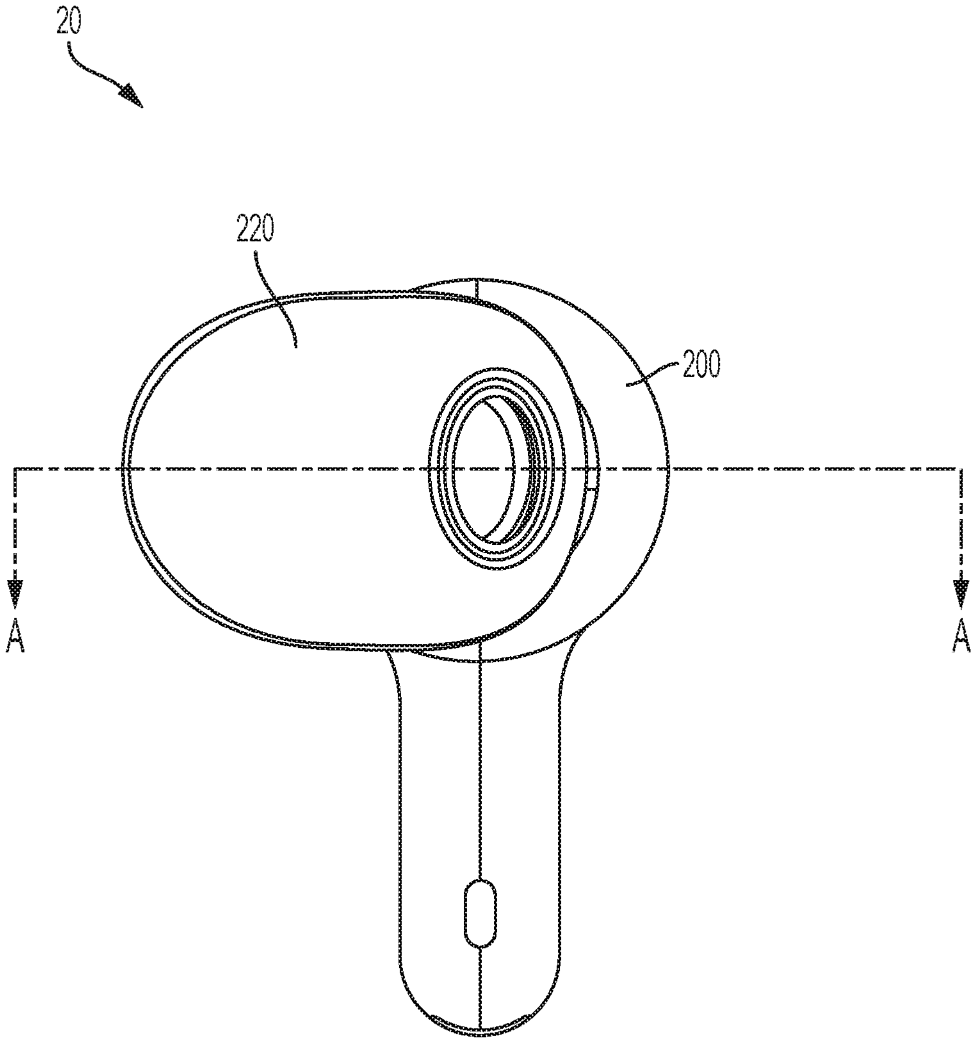
FIG. 4A is an illustration of a front of a headphone according to an embodiment of the present invention.
Figure 4B:
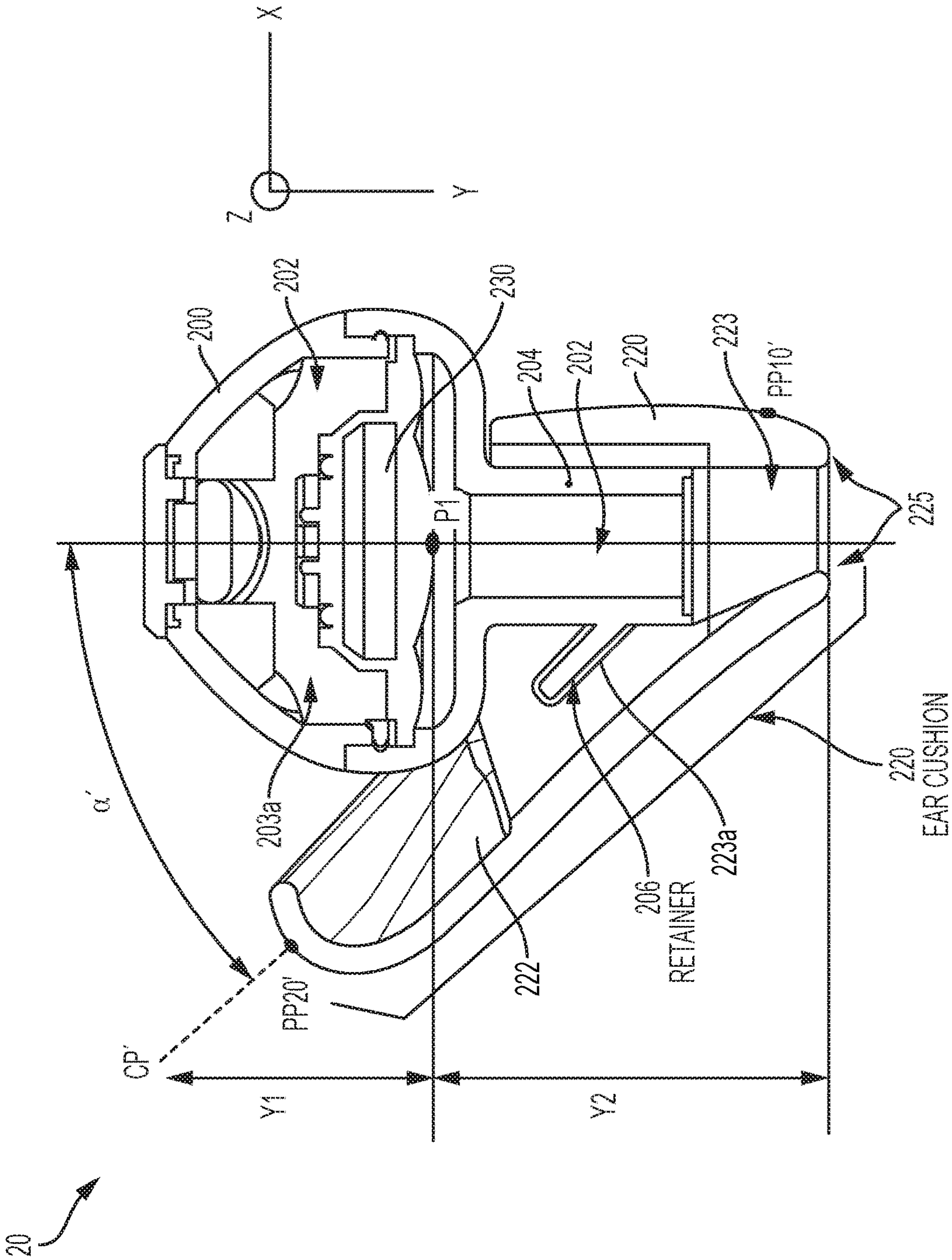
FIG. 4B is an illustration of the cross-sectional view of the headphone of FIG. 4A taken along AA.

FIG. 4A is an illustration of a front of a headphone according to an embodiment of the present invention, and FIG. 4B is an illustration of the cross-sectional view of the headphone of FIG. 4A taken along AA. As illustrated in FIG. 4A, a headphone 20 includes a housing 200 and a cushion 220.

As illustrated in FIG. 4B, the headphone 20 also includes a miniature speaker 230. The housing 200 can include an internal cavity 202. A tip portion of the cavity 202 preferably may have a rounded shape or a partial spherical shape. The tip portion of the cavity 202 may provide a dome. The miniature speaker 230 is positioned inside the dome of the cavity 202. For example, the miniature speaker 230 may be positioned along a center axis of the dome inside the cavity 202.

The miniature speaker 230 can be comprised of drivers, transducer, receivers and receiver elements. For example, the drivers, transducer, receivers and receiver elements can form an acoustic driver for converting applied audio signals to acoustic energy. Having the miniature speaker 230 positioned at a base of the dome inside the cavity 202, the acoustic driver of the miniature speaker 230 can be acoustically coupled to a first chamber 203*a* of the housing 200.

The housing 200 includes a nozzle portion 204 that extends from the main body of the housing 200 along a first axis. The nozzle portion 204 extends toward an ear canal of a user's ear (not shown) when the headphone is worn by the user. As illustrated in FIG. 4B, if the cross-section of the headphone 20 is aligned substantially along the XY-plane, the nozzle portion 204 may extend along the Y-axis.

The housing 200 also may include a housing retainer 206. The housing retainer 206 extends from the side of the nozzle portion 204. The housing retainer 206 may extend from the side of the nozzle portion 204 at an angle α' from the Y-axis.

The cushion 220 of the headphone 20 preferably has an ergonomic exterior shape. The exterior shape of the cushion 220 preferably is designed to be worn in a user's cavum conchae region. The cushion 220 is configured to secure the wearing of the headphone 20 by a user and to provide comfort to the user while wearing the headphone 20.

The cushion 220 includes an inner cavity 223 along its main body. The inner cavity 223 of the cushion 220 can accommodate the nozzle portion 204 of the housing 200 therein. The inner cavity 223 of the cushion 220 also may include a side indentation 223*a*. The indentation 223*a* can correspond to the shape of the housing retainer 206. For example, the housing retainer 206 may latch into the indentation 223*a* of the cushion 220. When the housing retainer 206 is latched into the side indentation 223*a* of the cushion 220, the engagement between the housing 200 and the cushion 220 can be more secured or more stable.

The portion having the side indentation 223*a* may be formed of a harder or stiffer material than the general body of the cushion 220. When the housing retainer 206 is engaged with the side indentation 223*a*, the housing retainer 206 ensures the ear cushion 220 always stays in place with respect to the speaker.

A center plane CP' may be visualized in the body of the cushion 220. The center plane CP' preferably is across the widest span of the cushion 220.

One end of the widest span is shown with a first point PP10', and the opposed end of the widest span of the center plane CP' is shown with a second point PP20'. The distance (L') between the first and second points PP10' and PP20' of the cushion 220 preferably is between 15.0 mm to 28.0 mm. As further explained later, the first and second points PP10' and PP20' can correspond to two separate pressure points onto a user's cavum conchae, when a headphone with the cushion 220 is worn by the user.

The cushion 220 includes a tip portion 222 about the first point PP1'. The tip portion 222 extends from the main body portion 221 of the cushion 220 at the angle α'. The angle α' is between 65 to 40 degrees. More generally, the angle α' may be between 80 to 30 degrees. The cushion 220 further includes an ear-canal aperture 225 at a first end of its main body. The ear-canal aperture 225 opens at the first end toward the ear canal of a user's ear, when the headphone is worn by the user. The center plane CP' substantially aligns with the direction the tip portion 222 extending from the main body of the cushion 220.

As illustrated in FIG. 4B, if the cross-section of the headphone 20 is aligned substantially along the XY-plane, the diaphragm-vibrating axis of the miniature speaker 230 similarly is parallel to the Y-axis. The sound exit axis of the nozzle portion 204 also is parallel to the Y-axis. The diaphragm-vibrating axis of the miniature speaker 230 and the sound exit axis of the nozzle portion 204 are substantially parallel to one another, thereby generating more effective and directive acoustic performance to a user. In addition, having the diaphragm-vibrating axis of the miniature speaker 230 and the sound exit axis of the nozzle portion 204 being substantially parallel to one another can prevent acoustic energy losses due to less blockage and reflection, for example, from interior walls of a headphone housing.

The diaphragm dome center P1 of the miniature speaker 230 can be located in the center of the cavity 202. In addition, the diaphragm dome center P1 of the miniature speaker 230 can be aligned with the ear-canal aperture 225. More specifically, the distance (Y1) between speaker diaphragm dome center P1 and the top of the tip portion of the cavity 202 is preferably between 0.10 mm to 18.0 mm.

In addition, when the housing retainer 206 is engaged with the indentation 223*a* in the cushion inner cavity 223, the housing retainer 206 keeps the distance (Y2) between the miniature speaker 230 and an outer edge of an ear-canal aperture 225 of the ear cushion 220 substantially consistent. The distance (Y2) between speaker diaphragm center P1 and the an outer edge of an ear-canal aperture 225 of the ear cushion 220 is preferably between 8.0 mm to 15.0 mm. This distance range provides the best for acoustical performance to the user. When the housing retainer 206 is engaged with the side indentation 223*a*, the housing retainer 206 can keep the distance (Y2) substantially consistent.

Figure 5:
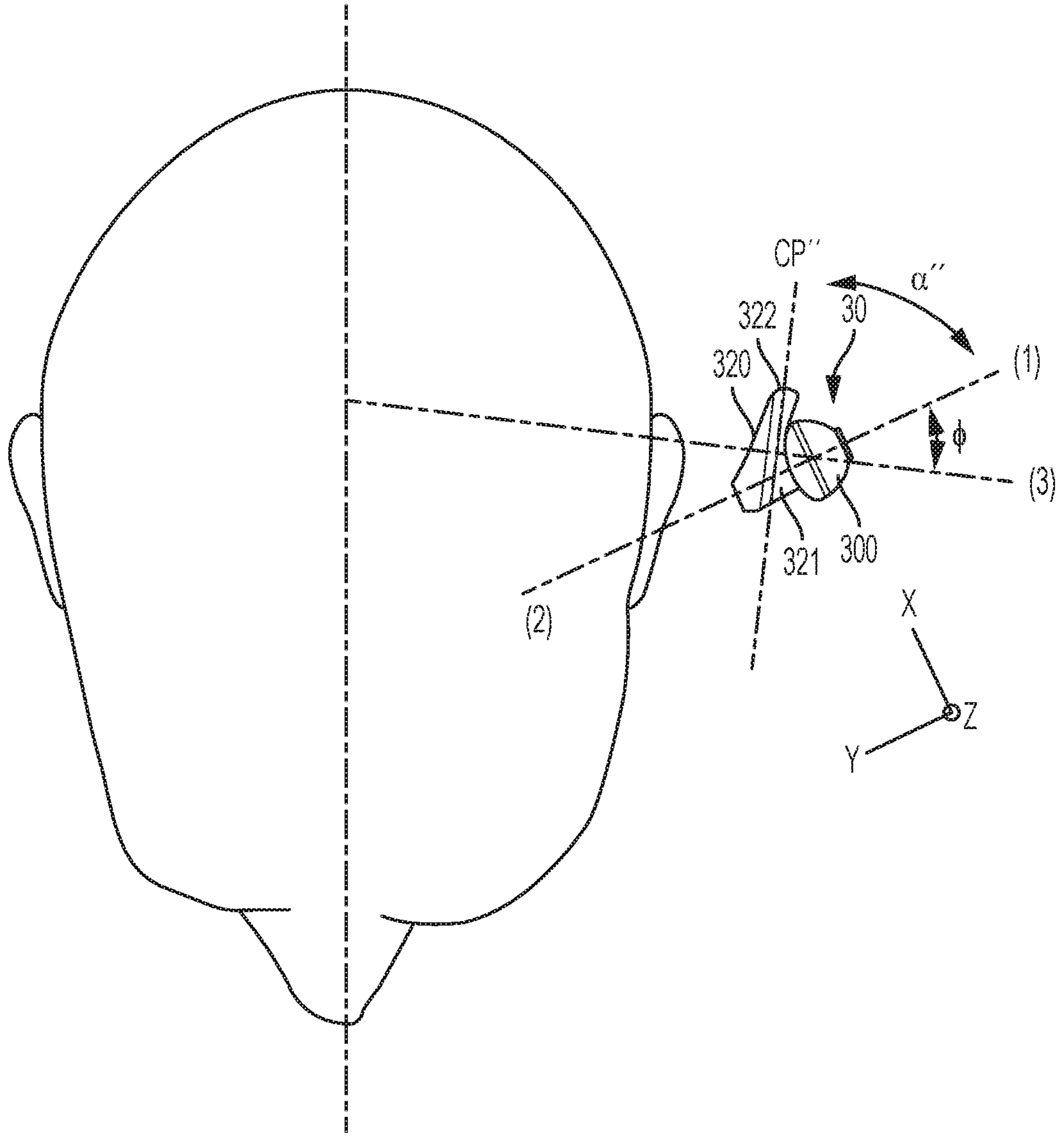
FIG. 5 is an illustration of the fit of a headphone with respect to a user's head according to an embodiment of the present invention.

FIG. 5 is an illustration of the fit of a headphone with respect to a user's head according to an embodiment of the present invention. In FIG. 5, a headphone 30 includes a housing 300 and a cushion 320.

The cushion 320 preferably has an ergonomic exterior shape. The exterior shape of the cushion 320 is designed to be fitted within the cavum conchae area of a user's ear when the headphone 30 is worn by the user. In addition, the cushion 320 is configured to secure the wearing of the headphone 30 by a user and to provide comfort to the user while wearing the headphone 30.

The cushion 320 includes a cushion main body portion 321 and a cushion tip portion 322. The cushion main body portion 321 also includes an inner cavity that can accommodate the nozzle portion (not explicitly shown) of the housing therein.

A center plane CP" may be visualized along the body of the cushion 320. The cushion center plane CP" preferably is across the widest span of the cushion 320. The cushion tip portion 322 would extend from the cushion main body portion 321 at an angle α" from AXIS Y. The angle α" is between 65 to 40 degrees. More generally, the angle α" may be between 80 to 30 degrees.

As illustrated in FIG. 5, if view from a top of a user's head, if the cross-section of the headphone the headphone 30 is to be worn by the user along an user wearing in/out axis (3). The user wearing in/out axis (3) is perpendicular to the cushion center plane CP". Neither the diaphragm-vibrating axis (1) of a miniature speaker (not explicitly shown) inside of the housing 300 nor the sound exit axis (2) of the headphone 30 is parallel to the user wearing in/out axis (3).

In a preferred embodiment, the angle Ø between the user wearing in/out axis (3) and the diaphragm-vibrating axis (1) is between 20 to 50 degrees. More generally, the angle Ø between the user wearing in/out axis (3) and the diaphragm-vibrating axis (1) is preferably between 10 to 60 degrees.

Figure 6:
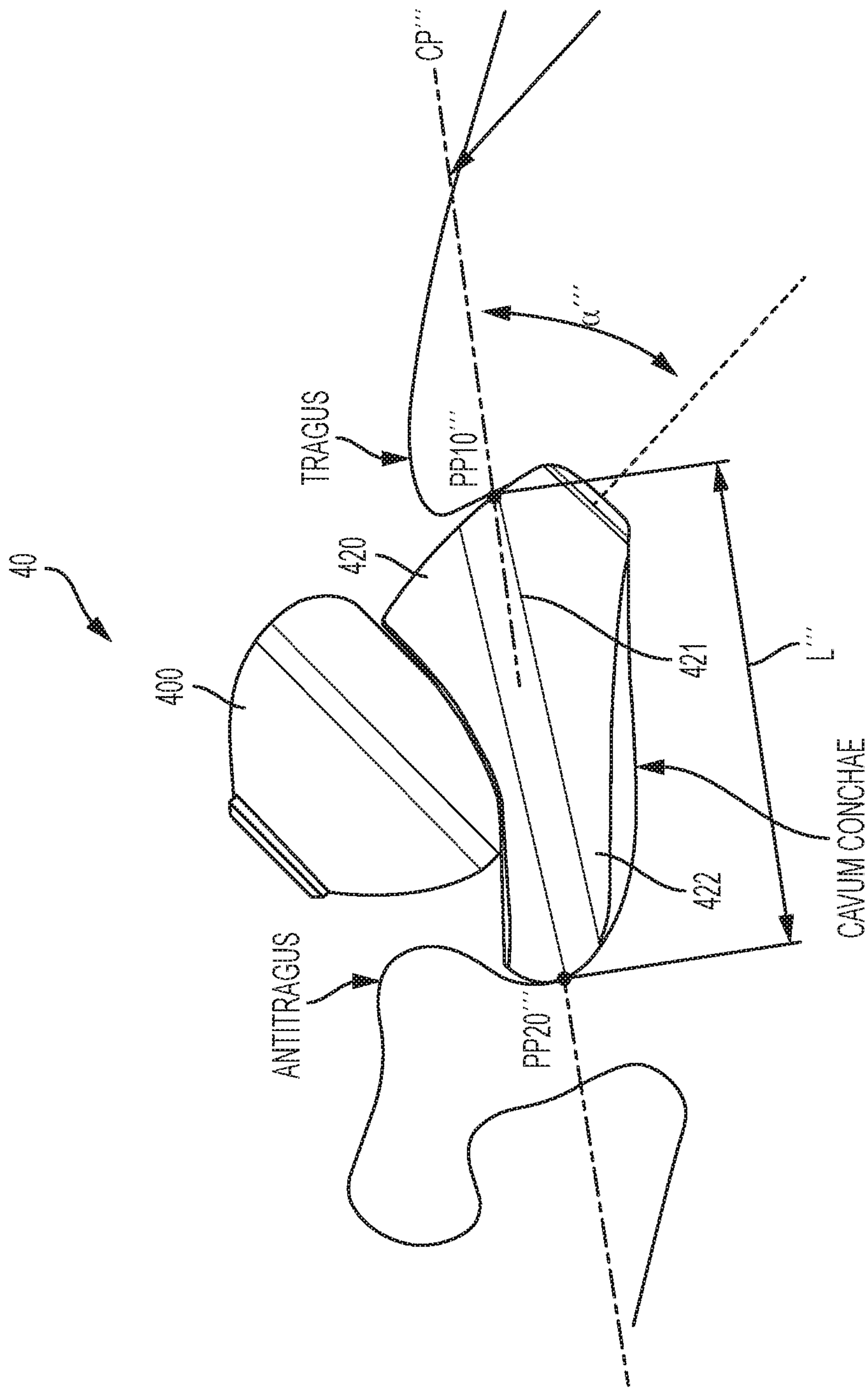
FIG. 6 is an illustration of a side perspective view of the fit of a headphone with respect to a user's outer ear according to an embodiment of the present invention.

FIG. 6 is an illustration of a side perspective view of the fit of the headphone with respect to a user's outer ear according to an embodiment of the present invention. In FIG. 6, a headphone 40 includes a housing 400 and a cushion 420.

The cushion 420 preferably has an ergonomic exterior shape. The exterior shape of the cushion 420 is designed to be fitted within the cavum conchae area of a user's ear when the headphone 40 is worn by the user. The cushion 420 is configured to secure the wearing of the headphone 40 by a user and to provide comfort to the user while wearing the headphone 40.

The cushion 420 includes a cushion main body portion 421 and a cushion tip portion 422. The cushion main body portion 421 also includes an inner cavity that can accommodate the nozzle portion (not explicitly shown) of the housing therein.

A center plane CP'" may be visualized along the body of the cushion 420. The cushion center plane CP'" preferably is across the widest span of the cushion 420. The cushion tip portion 422 would extend from the cushion main body portion 421 at an angle α'" from AXIS Y. The angle α'" is between 65 to 40 degrees. More generally, the angle α'" may be between 80 to 30 degrees.

The center plane CP'" preferably is across the widest span of the cushion 420. One end of the widest span is shown with a first pressure point PP10'", and the opposed end of the widest span of the center plane CP'" is shown with a second pressure point PP20'". The first pressure point PP10'" is on the exterior surface of the cushion main body portion 421 along the illusory center plane CP'". The second pressure point PP20'" is on the exterior surface of the cushion tip portion 422 along the illusory center plane CP'".

The distance (L'") between the first and second pressure points PP10'" and PP20'" of the cushion 420 preferably is between 15.0 mm to 28.0 mm More specifically, the distance (L'") between the first and second pressure points PP10'" and PP20'" of the cushion 420 is to closely approximate the size of the cavum conchae of a user's ear.

As illustrated in FIG. 6, the first and second pressure points PP10'" and PP20'" preferably fit within the cavum conchae of the user's ear. For example, the first pressure points PP10'" is to be fitted in the user ear underneath of the tragus of the user's ear. The second pressure points PP20'" is to be fitted in the user ear underneath of the antitragus of the user's ear. The distance (L'") is intended to cover across the user's cavum conchae region for providing stability, fit and comfort.

As illustrated in FIG. 6, the cushion 420 enhances the comfort and tight seal of the headphone in the user's ear. The cushion 420 also ensures the proper wear, fit or location of the headphone in the user's ear. Due to the fit of the two pressure points PP10'" and PP20'" within the ear cavum conchae region, the cushion 420 ensures keeping the sound source closer to ear canal during wear and to delivery sound directly into the eardrum. Thus, the user does not necessarily have to raise the volume level to enjoy the music.

Figure 7:
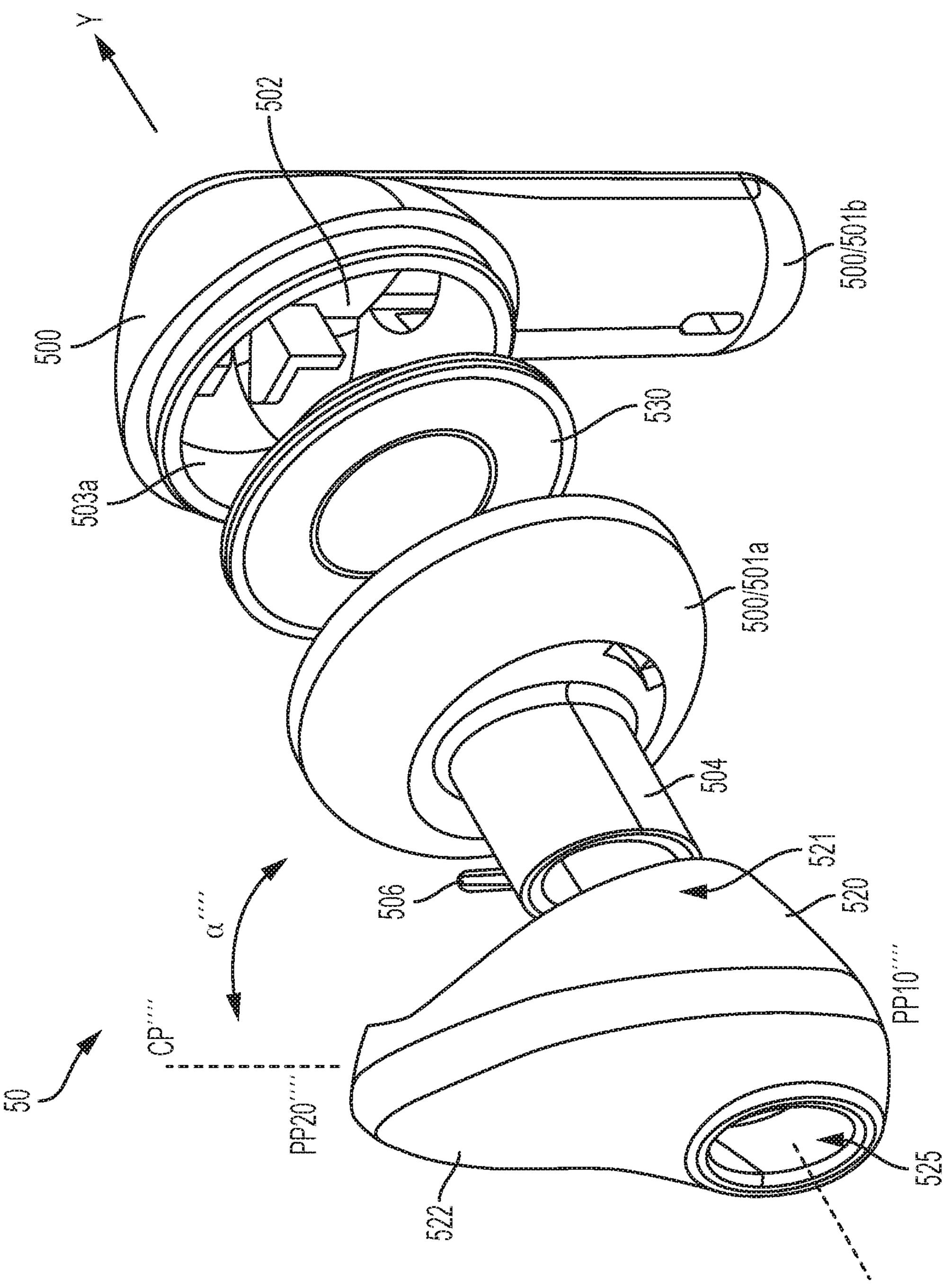
FIG. 7 is an illustration of an explored view of a headphone according to an embodiment of the present invention.

FIG. 7 is an illustration of an explored view of a headphone according to an embodiment of the present invention. In FIG. 7, a headphone 50 includes a housing 500, a cushion 520, and a miniature speaker 530. The housing 500 may include a front housing cover 501*a* and a rear housing cover 501*b*. Each of the front housing cover 501*a* and the rear housing cover 501*b* may have an internal cavity. When the front and rear housing covers 501*a* and 501*b* are engaged with one another, an internal housing cavity 502 may be formed within the front and rear housing covers 501*a* and 501*b*.

A tip portion of the internal cavity of the rear housing cover 501*b* preferably may have a rounded shape or a partial spherical shape. The tip portion of internal cavity of the rear housing cover 501*b* may provide a dome.

The miniature speaker 530 is positioned between the front housing cover 501*a* and the rear housing cover 501*b* inside the dome of the housing cavity 502. For example, the miniature speaker 530 may be positioned along a center axis of the dome inside the housing cavity 502.

The miniature speaker 530 can be comprised of drivers, transducer, receivers and receiver elements. For example, the drivers, transducer, receivers and receiver elements can form an acoustic driver for converting applied audio signals to acoustic energy. Having the miniature speaker 530 positioned at a base of the dome inside the housing cavity 502, the acoustic driver of the miniature speaker 530 can be acoustically coupled to a first chamber 503*a* of the housing 500.

The front housing cover 501*a* includes a nozzle portion 504 that extends from the main body of the housing 500 along a first axis. The nozzle portion 504 extends toward an ear canal of a user's ear (not shown) when the headphone is worn by the user. If the cross-section of the headphone 50 is aligned substantially along the XY-plane, the nozzle portion 504 may extend along the Y-axis.

The front housing cover 501*a* also may include a housing retainer 506. The housing retainer 506 extends from the side of the nozzle portion 504. The housing retainer 506 may extend from the side of the nozzle portion 504 at an angle α"" from the Y-axis.

The cushion 520 of the headphone 50 preferably has an ergonomic exterior shape. The exterior shape of the cushion 520 preferably is designed to be worn in a user's cavum conchae region. In addition, the cushion 520 is configured to secure the wearing of the headphone 50 by a user and to provide comfort to the user while wearing the headphone 50.

The cushion 520 includes an inner cavity 523 along its main body. The inner cavity 523 of the cushion 520 can accommodate the nozzle portion 504 of the housing 500 therein. The inner cavity 523 of the cushion 520 also may include a side indentation 523*a*. The indentation 523*a* can correspond to the shape of the housing retainer 506. For example, the housing retainer 506 may latch into the indentation 523*a* of the cushion 520. When the housing retainer 506 is latched into the side indentation 523*a* of the cushion 520, the engagement between the housing 500 and the cushion 520 can be more secured or more stable.

The portion having the side indentation (not explicitly shown) may be formed of a harder or stiffer material than the general body of the cushion 520. When the housing retainer 506 is engaged with the indentation in the retainer portion, the housing retainer 506 ensures the ear cushion 520 always stays in place with respect to the speaker.

A center plane CP"" may be visualized in the body of the cushion 520. The center plane CP"" preferably is across the widest span of the cushion 520.

One end of the widest span is shown with a first point PP10"", and the opposed end of the widest span of the center plane CP"" is shown with a second point PP20"". The distance (L"") between the first and second points PP10"" and PP20"" of the cushion 520 preferably is between 15.0 mm to 28.0 mm. The first and second points PP10"" and PP20"" preferably correspond to two separate pressure points onto a user's cavum conchae region, when a headphone 50 with the cushion 520 is worn by the user.

The cushion 520 includes a tip portion 522 about the first point PP1"". The tip portion 522 extends from the main body portion 521 of the cushion 520 at the angle α"". The angle α"" is between 65 to 40 degrees. More generally, the angle α"" may be between 80 to 30 degrees. The cushion 520 further includes an ear-canal aperture 525 at a first end of its main body portion 521. The ear-canal aperture 525 opens at the first end toward the ear canal of a user's ear, when the headphone is worn by the user. The center plane CP"" substantially aligns with the direction the tip portion 522 extending from the main body of the cushion 520.

Figure 8A:
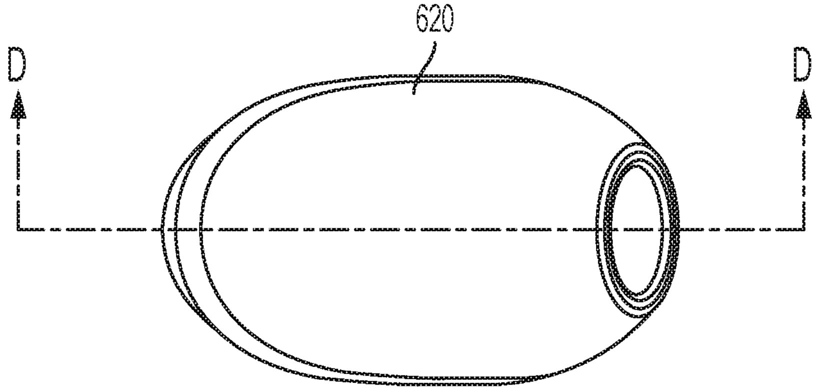
FIG. 8A is an illustration of a headphone cushion according to a preferred embodiment of the present invention.
Figure 8B:
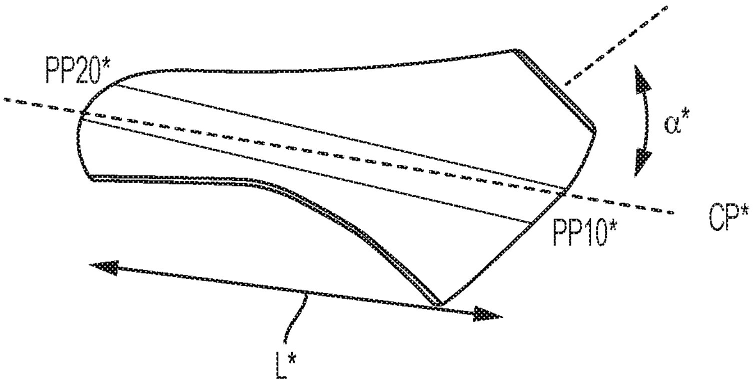
FIG. 8B is an illustration of a side view of the headphone cushion shown in FIG. 8A.
Figure 8C:
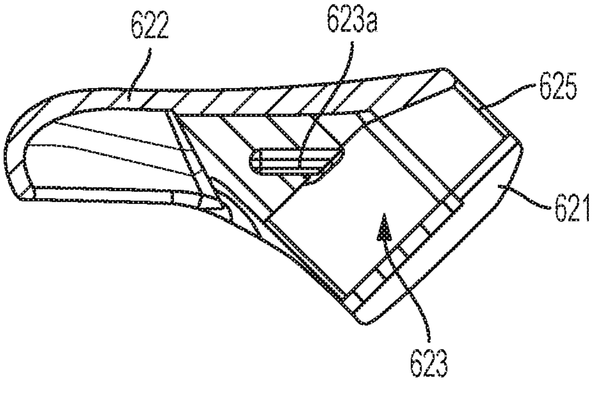
FIG. 8C is an illustration of the cross-sectional view of the headphone cushion of FIG. 8A taken along DD.

FIG. 8A is an illustration of a headphone cushion according to a preferred embodiment of the present invention. FIG. 8B is an illustration of a side view of the headphone cushion shown in FIG. 8A, and FIG. 8C is an illustration of the cross-sectional view of the headphone cushion of FIG. 8A taken along DD. FIG. 8A illustrates a headphone cushion 620. The cushion 620 preferably has an ergonomic exterior shape. The exterior shape of the cushion 620 preferably is designed to be worn in a user's cavum conchae region. In addition, the cushion 620 is configured to secure the wearing of a headphone by a user and to provide comfort to the user while wearing the headphone.

The cushion 620 includes an inner cavity 623 along its main body. The inner cavity 623 of the cushion 620 can accommodate at least a portion of the headphone housing therein. The inner cavity 623 of the cushion 620 also may include a side indentation 623*a*. The indentation 623*a* can correspond to the shape of a protruding portion of the headphone housing. For example, the headphone housing may include a protruding housing retainer, which may latch into the indentation 623*a* of the cushion 620. When the protruding housing retainer is latched into the side indentation 623*a* of the cushion 620, the engagement between the headphone housing and the cushion 620 can be more secured or more stable.

The region of the cushion 620 including the indentation 623*a* may be formed of a harder or stiffer material than the exterior of the cushion 620. For example, the retainer portion also can be formed of silicon rubber material. The hardness of the retainer silicon rubber material preferably is with durometer from 0 Shore A to 70 Shore A.

A center plane CP* may be visualized in the body of the cushion 620. The center plane CP* preferably is across the widest span of the cushion 620.

One end of the widest span is shown with a first point PP10*, and the opposed end of the widest span of the center plane CP* is shown with a second point PP20*. The distance (L*) between the first and second points PP10* and PP20* of the cushion 620 preferably is between 15.0 mm to 28.0 mm. The first and second points PP10* and PP20* preferably correspond to two separate pressure points onto a user's cavum conchae region, when a headphone with the cushion 620 is worn by the user.

The cushion 620 includes a tip portion 622 about the first point PP1*. The tip portion 622 extends from the main body portion 621 of the cushion 620 at the angle α*. The angle α* is between 65 to 40 degrees. More generally, the angle α* may be between 80 to 30 degrees. The cushion 620 further includes an ear-canal aperture 625 at a first end of its main body. The ear-canal aperture 625 opens at the first end toward the ear canal of a user's ear, when the headphone is worn by the user. The center plane CP* substantially aligns with the direction the tip portion 622 extending from the main body of the cushion 620.

The cushion 620 contains stress-relieving features. The inner hollowed cavity in the rear section that reduces stress against a user's antitragus when the earpiece device is worn by the user. For example, if the cushion material has hardness of 10 Shore A silicone, rear compression force relative to distance would range from 0.10 N/mm to 0.20 N/mm.

Figure 9A:
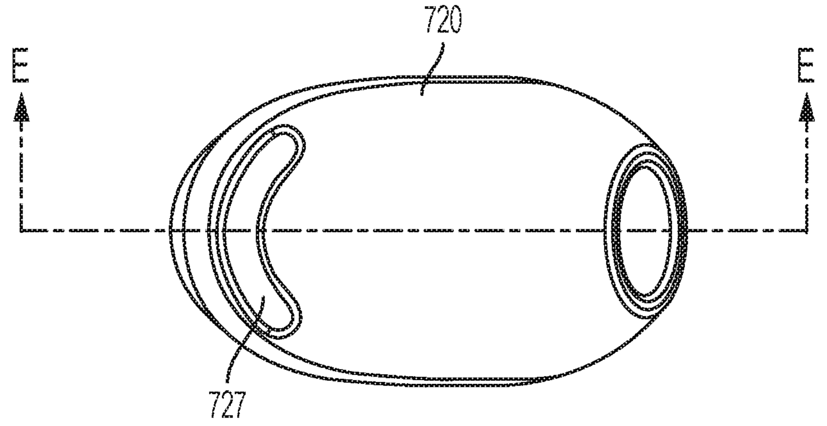
FIG. 9A is an illustration of a headphone cushion according to another preferred embodiment of the present invention.
Figure 9B:
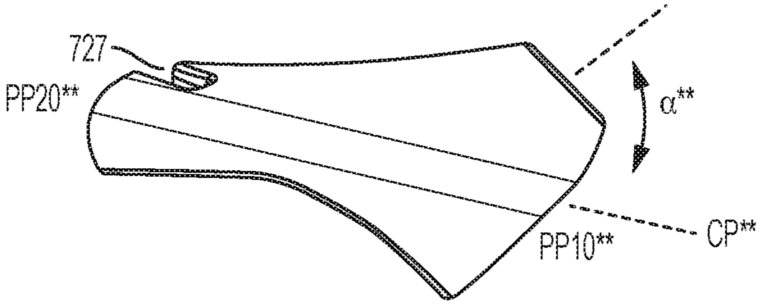
FIG. 9B is an illustration of a side view of the headphone cushion shown in FIG. 9A.
Figure 9C:
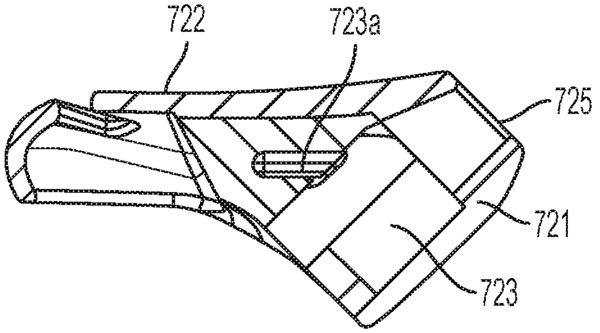
FIG. 9C is an illustration of the cross-sectional view of the headphone cushion of FIG. 9A taken along EE.

FIG. 9A is an illustration of a headphone cushion according to another preferred embodiment of the present invention. FIG. 9B is an illustration of a side view of the headphone cushion shown in FIG. 9A, and FIG. 9C is an illustration of the cross-sectional view of the headphone cushion of FIG. 9A taken along EE. FIG. 9A illustrates a headphone cushion 720. The cushion 720 preferably has an ergonomic exterior shape. The exterior shape of the cushion 720 preferably is designed to be worn in a user's cavum conchae region. In addition, the cushion 720 is configured to secure the wearing of a headphone by a user and to provide comfort to the user while wearing the headphone.

The cushion 720 includes an inner cavity 723 along its main body. The inner cavity 723 of the cushion 720 can accommodate at least a portion of the headphone housing therein. The inner cavity 723 of the cushion 720 also may include a side indentation **723*a*. The indentation 723*a* can correspond to the shape of a protruding portion of the headphone housing. For example, the headphone housing may include a protruding housing retainer, which may latch into the indentation 723*a* of the cushion 720. When the protruding housing retainer is latched into the side indentation 723*a* of the cushion 720, the engagement between the headphone housing and the cushion 720** can be more secured or more stable.

The region of the cushion 720 including the indentation **723*a* may be formed of a harder or stiffer material than the exterior of the cushion 720**. For example, the retainer portion also can be formed of silicon rubber material. The hardness of the retainer silicon rubber material preferably is with durometer from 0 Shore A to 70 Shore A.

A center plane CP may be visualized in the body of the cushion 720. The center plane CP preferably is across the widest span of the cushion 720.

One end of the widest span is shown with a first point PP10, and the opposed end of the widest span of the center plane CP is shown with a second point PP20. The distance (L) between the first and second points PP10 and PP20** of the cushion 720 preferably is between 15.0 mm to 28.0 mm. The first and second points PP10** and PP20** preferably correspond to two separate pressure points onto a user's cavum conchae region, when a headphone with the cushion 720** is worn by the user.

The cushion 720 includes a tip portion 722 about the first point PP1. The tip portion 722 extends from the main body portion 721 of the cushion 720 at the angle α. The angle α is between 65 to 40 degrees. More generally, the angle α may be between 80 to 30 degrees. The cushion 720 further includes an ear-canal aperture 725 at a first end of its main body. The ear-canal aperture 725 opens at the first end toward the ear canal of a user's ear, when the headphone is worn by the user. The center plane CP substantially aligns with the direction the tip portion 722 extending from the main body of the cushion 720**.

The cushion 720 also includes a thru-cut 727. The inner hollowed cavity with the thru-cut 727 can further reduce stress against a user's antitragus when the headphone is worn by the user. For example, if the primary cushion material has a hardness of 10 Shore A silicone, rear compression force relative to distance would range from 0.05 N/mm to 0.15 N/mm.

Figure 10A:
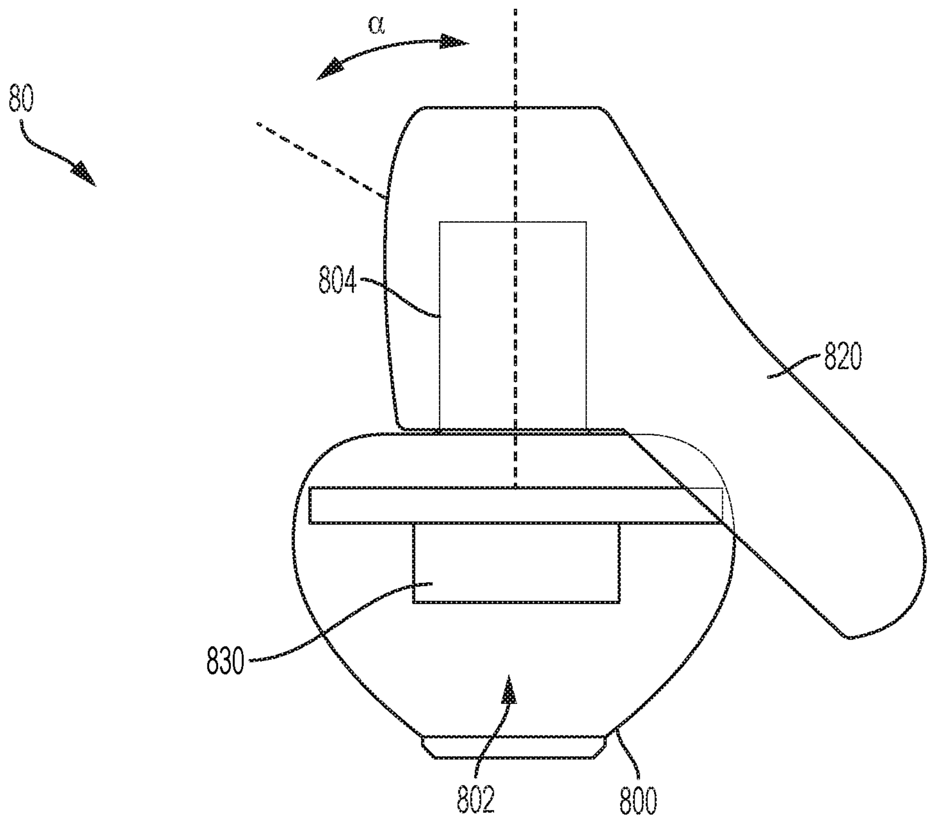
FIG. 10A is an illustration of a cross-sectional view of a headphone according to a preferred embodiment of the present invention.
Figure 10B:
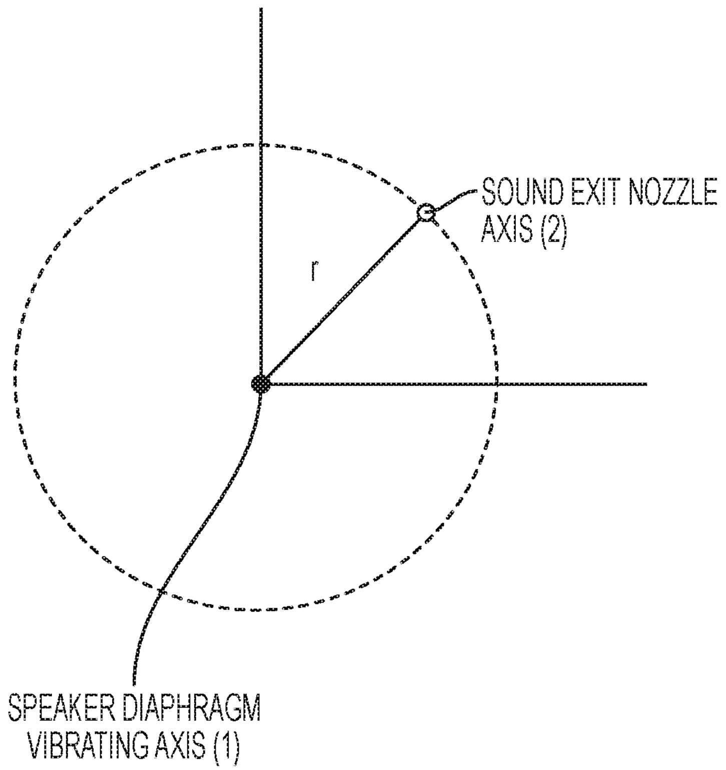
FIG. 10B is an illustration of the axes alignment between the diaphragm-vibrating axis to the sound exit nozzle axis of the headphone shown in FIG. 10A.

FIG. 10A is an illustration of a cross-section view of a headphone according to a preferred embodiment of the present invention, and FIG. 10B is an illustration of the axes alignment between the diaphragm-vibrating axis to the sound exit nozzle axis of the headphone shown in FIG. 10A. In FIG. 10A, a headphone 80 includes a housing 800, a cushion 820, and a miniature speaker 830.

The housing 800 include an internal cavity 802. A tip portion of the internal cavity 802 preferably may have a rounded shape or a partial spherical shape. The tip portion of internal cavity 802 of the housing 800 may provide a dome.

The miniature speaker 830 is positioned inside the dome of the housing cavity 802. More specifically, the miniature speaker 830 is positioned along a center axis of the dome inside the housing cavity 802. The miniature speaker 830 can be comprised of drivers, transducer, receivers and receiver elements. For example, the drivers, transducer, receivers and receiver elements can form an acoustic driver for converting applied audio signals to acoustic energy. Having the miniature speaker 830 positioned at a base of the dome inside the housing cavity 802, the acoustic driver of the miniature speaker 830 can be acoustically coupled to a first internal chamber of the housing 800.

The housing 800 also includes a nozzle portion 804 that extends from the main body of the housing 800 along a first axis. The nozzle portion 804 extends toward an ear canal of a user's ear (not shown) when the headphone is worn by the user. If the cross-section of the headphone 80 is aligned substantially along the XY-plane, the nozzle portion 804 may extend along the Y-axis. As illustrated in FIG. 10A, the first axis along which the nozzle portion 802 extends is co-linear to the center axis of the dome inside the housing cavity 802.

As illustrated in FIGS. 10A and 10B, the diaphragm-vibrating axis is preferably parallel to a sound exit nozzle axis of the headphone. However, the diaphragm-vibrating axis does not need to be the same as or completely overlapped with the sound exit nozzle axis. The distance (r) between the diaphragm-vibrating axis and the sound exit nozzle axis is preferably between 0.01 mm to 3.5 mm.

Figure 11A:
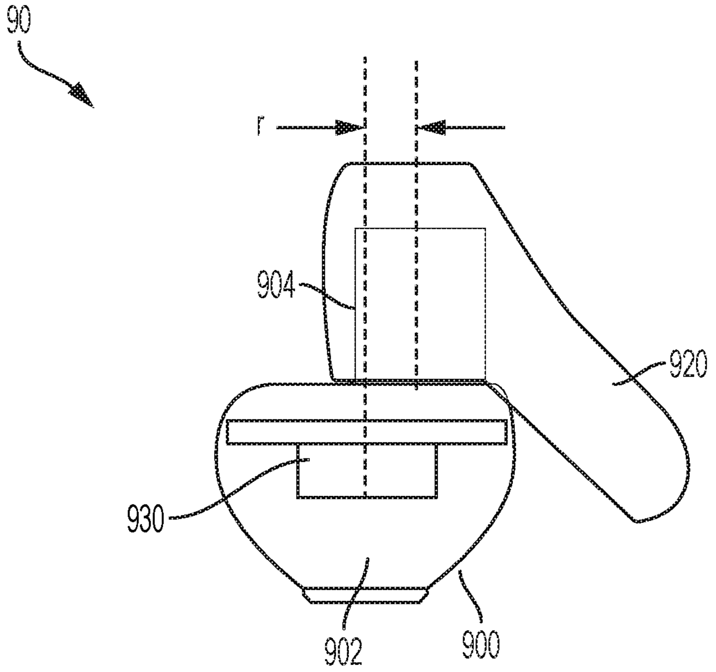
FIG. 11A is an illustration of a cross-sectional view of a headphone according to another preferred embodiment of the present invention.
Figure 11B:
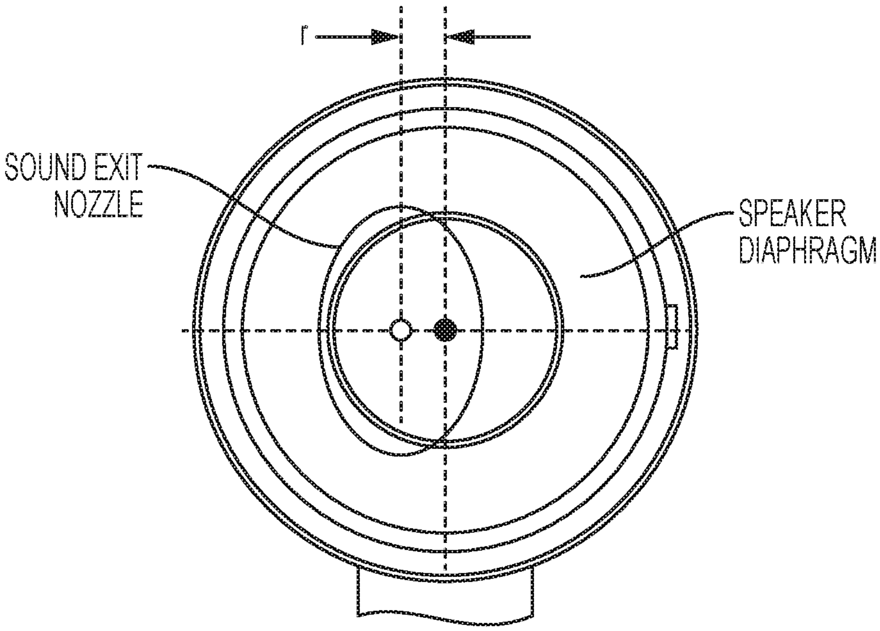
FIG. 11B is an illustration of the axes alignment between the diaphragm-vibrating axis to the sound exit nozzle axis of the headphone shown in FIG. 11A.

FIG. 11A is an illustration of a cross-section view of a headphone according to another preferred embodiment of the present invention, and FIG. 11B is an illustration of the axes alignment between the diaphragm-vibrating axis to the sound exit nozzle axis of the headphone shown in FIG. 11A. In FIG. 11A, a headphone 90 includes a housing 900, a cushion 920, and a miniature speaker 930.

The housing 900 include an internal cavity 902. A tip portion of the internal cavity 902 preferably may have a rounded shape or a partial spherical shape. The tip portion of internal cavity 902 of the housing 900 may provide a dome.

The miniature speaker 930 is positioned inside the dome of the housing cavity 902. More specifically, the miniature speaker 930 is positioned along a center axis of the dome inside the housing cavity 902. The miniature speaker 930 can be comprised of drivers, transducer, receivers and receiver elements. For example, the drivers, transducer, receivers and receiver elements can form an acoustic driver for converting applied audio signals to acoustic energy. Having the miniature speaker 930 positioned at a base of the dome inside the housing cavity 902, the acoustic driver of the miniature speaker 930 can be acoustically coupled to a first internal chamber of the housing 900.

The housing 900 also includes a nozzle portion 904 that extends from the main body of the housing 900 along a first axis. The nozzle portion 904 extends toward an ear canal of a user's ear (not shown) when the headphone is worn by the user. If the cross-section of the headphone 90 is aligned substantially along the XY-plane, the nozzle portion 904 may extend along the Y-axis. As illustrated in FIG. 11A, the first axis along which the nozzle portion 902 extends is parallel to, but not co-linear to the center axis of the dome inside the housing cavity 902.

As illustrated in FIG. 11B, the diaphragm-vibrating axis is preferably parallel to a sound exit nozzle axis of the headphone. However, the diaphragm-vibrating axis does not need to be the same as or completely overlapped with the sound exit nozzle axis. Preferably, the distance between the diaphragm-vibrating axis and the sound exit nozzle axis does not exceed 3.5 mm.

Although not shown, the housing 900 may include more than one miniature speakers 930. As illustrated in FIG. 11, at least one of the multiple miniature speakers 930 may have its diaphragm-vibrating axis off from the sound exit nozzle axis. The distance between the diaphragm-vibrating axis of such a miniature speaker 930 and the sound exit nozzle axis of the housing 900 preferably does not exceed 3.5 mm.

Figure 12:
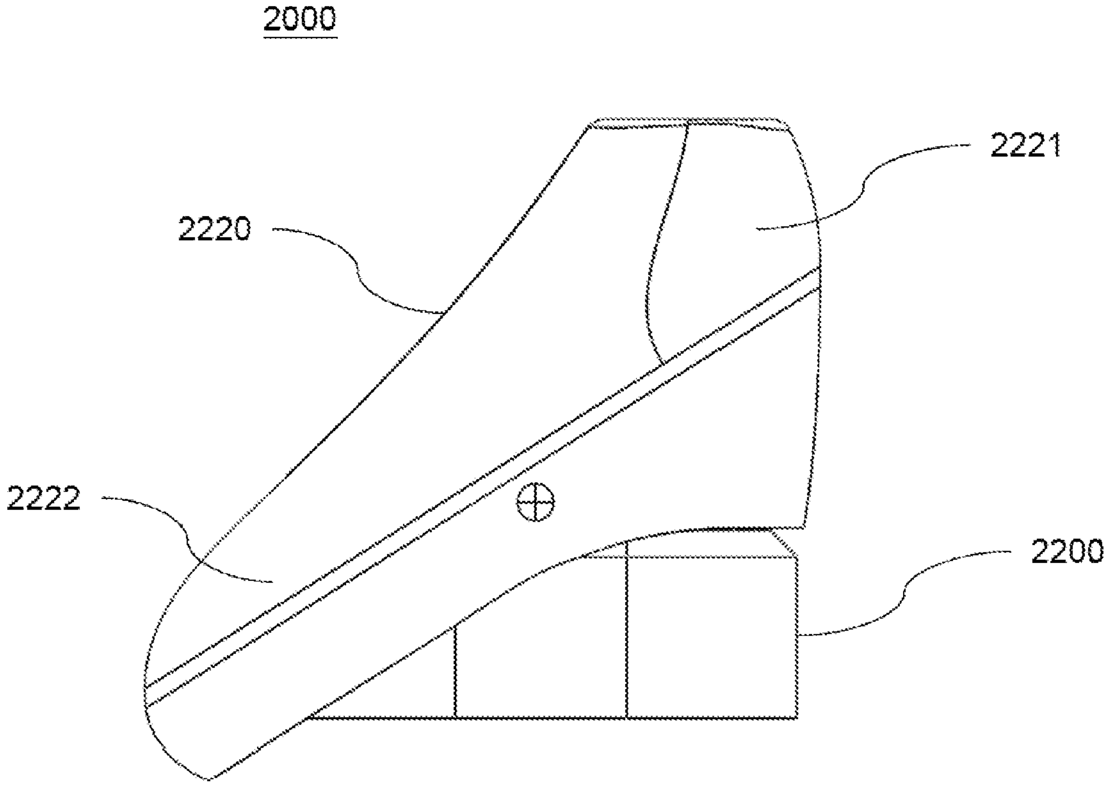
FIG. 12 is a side view of a headphone according to another embodiment of the present invention.

FIG. 12 is a side view of a headphone according to another embodiment of the present invention. In FIG. 12, a headphone 2000 includes a housing 2200 and a cushion 2220. The cushion 2220 includes a cushion main body portion 2221 and a cushion tip portion 2222. The cushion main body portion 2221 also includes an inner cavity that can accommodate a majority portion of the housing therein. For example, the housing 2200 includes a nozzle portion 2204 that extends from a chamber 2203 of the housing 2200. The nozzle portion 2204 extends along a first axis. The nozzle portion 2204 extends toward an ear canal of a user's ear (not shown) when the headphone 2000 is worn by the user.

As illustrated in FIG. 12, when the housing 2200 is assembled with the cushion 2220, a height of the housing 2200 preferably does not extend beyond the tip of the cushion 2220. When the housing 2200 is assembled with the cushion 2220, the nozzle portion 2204 is entirley inside of the cushion 2220. Also, the cushion 2220 can accommodate a portion of the chamber 2203 inside the cushion tip portion 2222.

Figure 13:
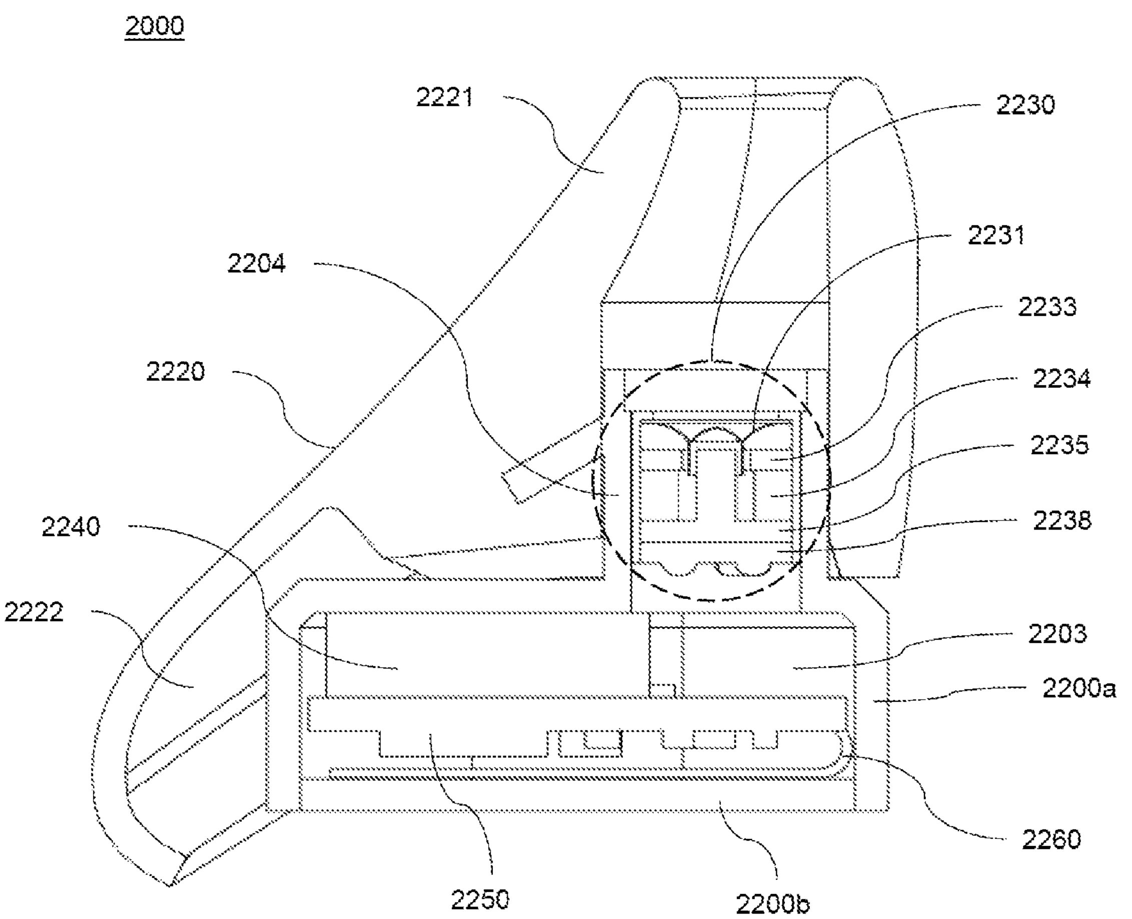
FIG. 13 is an illustration of the cross-sectional view of the headphone of FIG. 12.

FIG. 13 is an illustration of the cross-sectional view of the headphone of FIG. 12. As illustrated in FIG. 13, the headphone 2000 includes an internal cavity 2202 and a miniature speaker 2230. The miniature speaker 2230 is positioned along the first axis and inside the nozzle portion 2204 of the housing 2200.

The miniature speaker 2230 can be comprised of a driver, a transducer, and a receiver element. The driver, transducer, and receiver element can form an acoustic driver for converting applied audio signals to acoustic energy. For example, the speaker 2230 may include a diaphragm 2231, a washer 2233, a magnet 2234, and a yoke 2235. More specifically, the acoustic driver of the miniature speaker 2230 can be acoustically coupled to the front portion 2200*a* of the housing 2200. As illustrated in FIG. 13, the diaphragm-vibrating axis of the first diaphragm 2231 of the miniature speaker 2230 is preferably parallel to a sound exit nozzle axis of the headphone 2000. In particular, the diaphragm-vibrating axis of the miniature speaker 2230 is substantially the same as or mostly overlapped with the sound exit nozzle axis.

The headphone 2000 may include a speaker circuitry, such as a speaker PCB board 2238. The speaker PCB board 2238 may be placed next to the speaker 2230. The speaker PCB board 2238 preferably may be positioned inside the nozzle portion 2204 of the housing 2200.

The headphone 2000 preferably is a wireless headphone. The headphone 2000 preferably includes a battery 2240, a wireless interface circuitry 2250, and a wireless antenna 2260. The battery 2240, the wireless interface circuitry 2250, and the wireless antenna 2260 are positioned inside the cavity 2202. The battery 2240, the wireless interface circuitry 2250, and the wireless antenna 2260 are positioned inside the chamber 2203 of the housing 2200. In particular, the battery 2240 preferably is positioned in a side portion of the chamber 2203. The battery 2240 is positioned not to overlap with the first axis and not to block an opening of the nozzle portion 2204.

Figure 14:
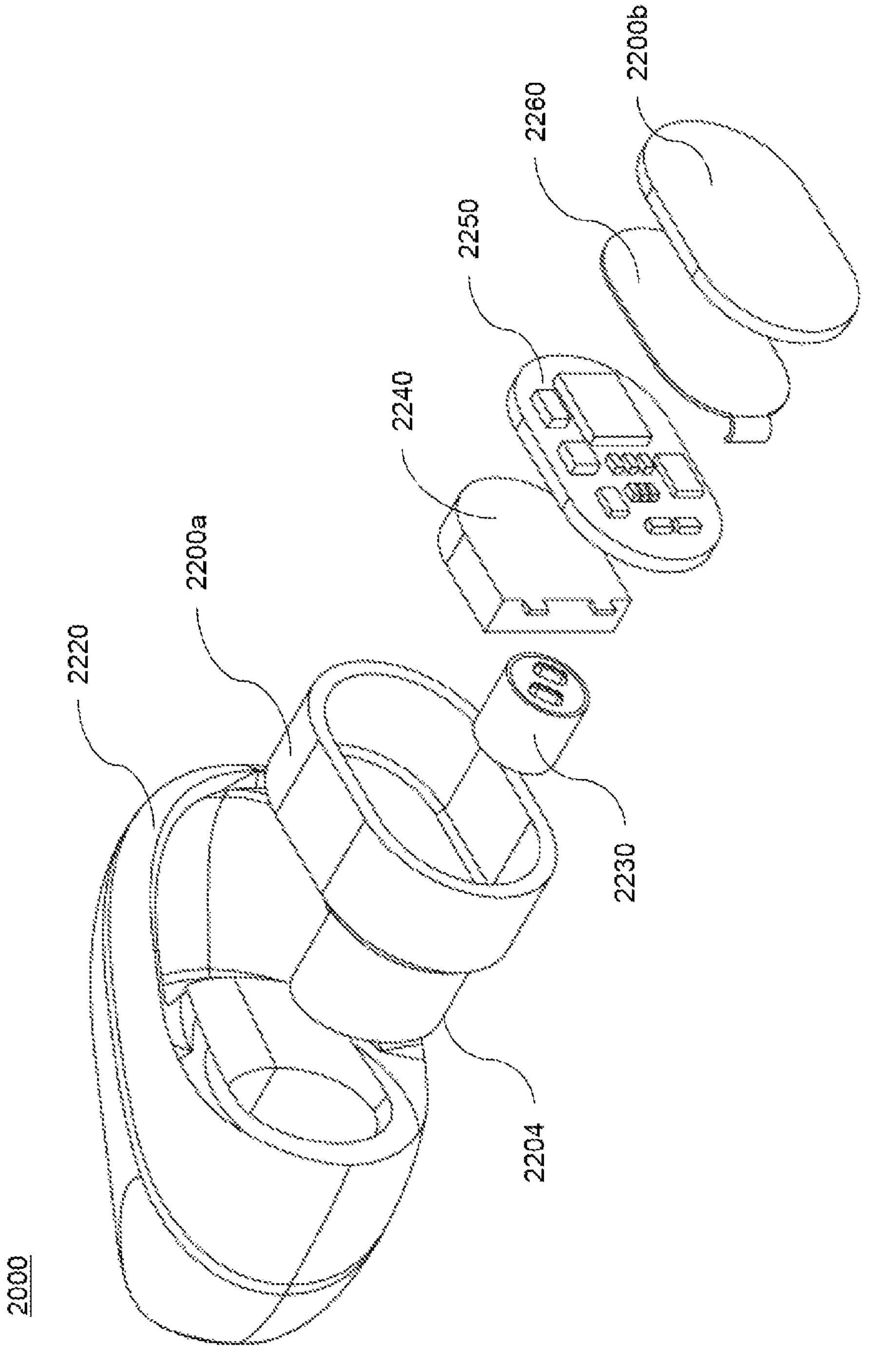
FIG. 14 is an illustration of an explored view of the headphone shown in FIG. 12.

FIG. 14 is an illustration of an explored view of the headphone shown in FIG. 12. As illustrated in FIG. 14, the headphone 2000 includes the housing 2200 and the cushion 2220. The housing 2200 preferably may have a front housing 2200*a* and a rear cover 2200*b*. The front housing 2200*a* and the rear cover 2200*b* include a hollow interior to form the chamber portion 2203.

The nozzle portion 2204 may be formed integrally with the front housing 2202*a*. A protruding housing retainer 2205 may be on a side exterior surface of the nozzle portion 2204. The protruding housing retainer 2205 may latch into an indentation of the cushion 2220. When the protruding housing retainer 2205 is latched into the indentation of the cushion 2220, the engagement between the headphone housing 2200 and the cushion 2220 can be more secured or more stable.

The portion of the cushion 2220 having the indentation may be formed of a harder or stiffer material than the general body of the cushion 2220. When the housing retainer 2205 is engaged with the indentation, the housing retainer 2205 ensures the cushion 2220 always stays in place with respect to the speaker 2230.

The headphone 2000 may include the battery 2240, the wireless interface circuitry 2250, and the wireless antenna 2260. The battery 2240, the wireless interface circuitry 2250, and the wireless antenna 2260 are positioned inside the cavity 2202 and behind the speaker 2230. For example, the battery 2240, the wireless interface circuitry 2250, and the wireless antenna 2260 are positioned inside the chamber 2203 of the housing 2200.

Figure 15:
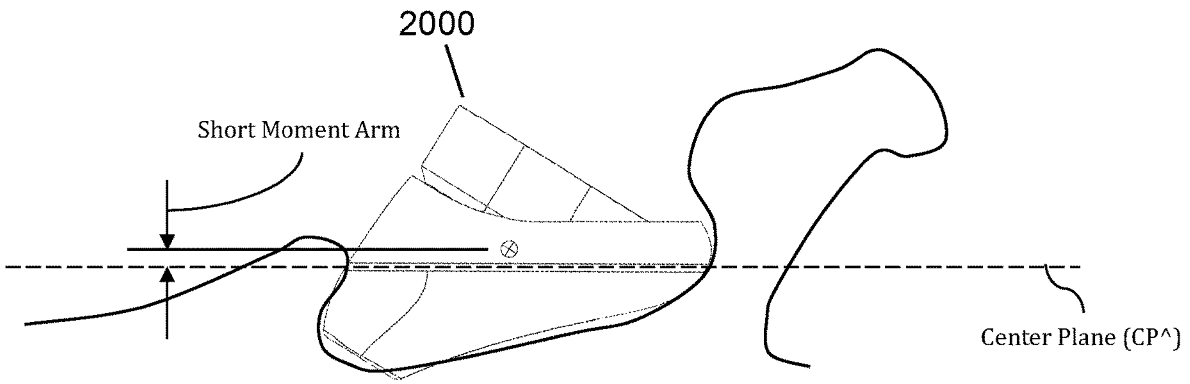
FIG. 15 is an illustration of a side perspective view of the fit and the center of mass of the headphone shown in FIG. 12 with respect to a user's outer ear.

FIG. 15 is an illustration of a side perspective view of the fit and the center of mass of the headphone shown in FIG. 12 with respect to a user's outer ear. As illustrated in FIG. 15, the headphone 2000 includes the housing 2200 and the cushion 2220. The cushion 2220 preferably has an ergonomic exterior shape. The exterior shape of the cushion 2220 is designed to be fitted within the cavum conchae area of a user's ear when the headphone 2000 is worn by the user. In addition, the cushion 2220 is configured to secure the wearing of the headphone 2000 by a user and to provide comfort to the user while wearing the headphone 2000.

The cushion 2220 includes a cushion main body portion 2221 and a cushion tip portion 2222. The cushion main body portion 2221 also includes an inner cavity that can accommodate the nozzle portion (not explicitly shown) of the housing therein.

A center plane CP/\ may be visualized along the body of the cushion 2220. The center plane CP/\ preferably is across the widest span of the cushion 2220. As the speaker 2230 is positioned inside the nozzle portion 2204 of the housing 2200, the center of mass ⊗ of the headphone 2000 is shifted away from a center of the chamber 2203 of the housing 2200. The center of mass ⊗ of the headphone 2000 is at or close to the nozzle portion. As illustrated in FIG. 15, the center of mass ⊗ of the headphone 2000 is close to the cushion center plane CP/\. The distance between the headphone's center of mass ⊗ and the cushion's center plane CP/\ may be visualized as moment arm. Because the center of mass ⊗ of the headphone 2000 is close to the cushion center plane CP/\, the headphone 2000 yields a short moment arm. The short moment arm can further reduce unintended dislodging of the headphone 2000.

Figure 16:
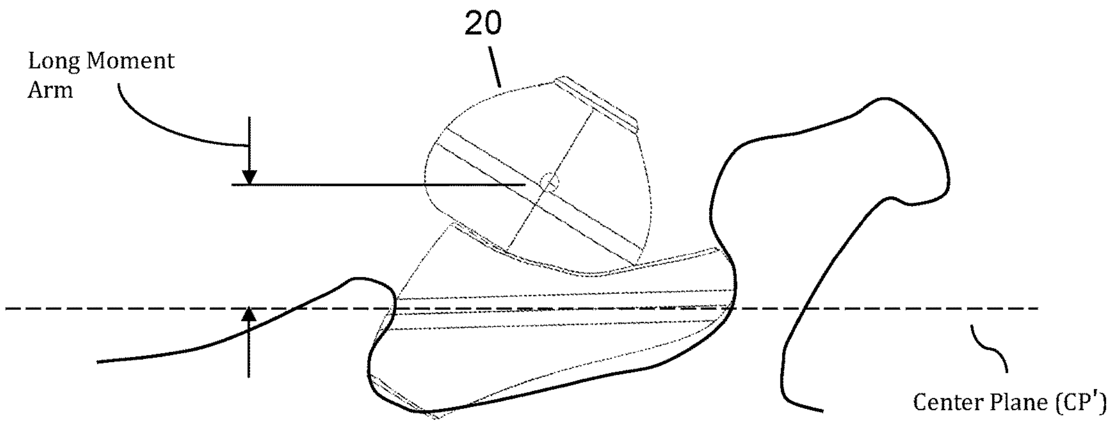
FIG. 16 is an illustration of a side perspective view of the fit and the center of mass of the headphone shown in FIG. 4B with respect to a user's outer ear.

FIG. 16 is an illustration of a side perspective view of the fit and the center of mass of the headphone shown in FIG. 4B with respect to a user's outer ear. As illustrated in FIG. 16, the headphone 20 includes the housing 200 and the cushion 220. The cushion 220 preferably has an ergonomic exterior shape. The exterior shape of the cushion 220 is designed to be fitted within the cavum conchae area of a user's ear when the headphone 20 is worn by the user. In addition, the cushion 220 is configured to secure the wearing of the headphone 20 by a user and to provide comfort to the user while wearing the headphone 20.

A center plane CP' may be visualized along the body of the cushion 220. The center plane CP' preferably is across the widest span of the cushion 220. As the speaker 230 positioned at a base of the dome inside the cavity 202 of the headphone 20, the center of mass ⊗ of the headphone 20 is at or near the center of the dome inside the cavity 202. In comparison to the headphone 2000 illustrated in FIG. 15, the center of mass ⊗ of the headphone 20 is more distant from the cushion center plane CF. The distance between the headphone's center of mass ⊗ and the cushion's center plane CP' may be visualized as moment arm. Because the center of mass ⊗ of the headphone 20 is more distant from the cushion center plane CP', the headphone 20 yields a long moment arm in comparison to the headphone 2000 illustrated in FIG. 15.

It will be apparent to those skilled in the art that various modifications and variations can be made in the headphone of embodiments of the invention without departing from the spirit or scope of the invention. Thus, it is intended that embodiments of the invention cover the modifications and variations of this invention provided they come within the scope of the appended claims and their equivalents.

What is claimed:

1. An earpiece device, comprising:

a housing, the housing including a first chamber and a nozzle portion, wherein the nozzle portion extends along a first axis and extends toward an ear canal of a user's ear when the earpiece device is worn by the user;

an acoustic driver for converting applied audio signals to acoustic energy, wherein the acoustic driver includes a diaphragm, wherein the acoustic driver is located substantially within the nozzle portion, wherein the acoustic driver is acoustically coupled to the first chamber of the housing, and wherein a vibrating axis of the diaphragm is substantially parallel to the first axis; and a cushion, the cushion including an inner cavity, an ear-canal aperture and a tip portion, wherein the inner cavity of the cushion accommodates the nozzle portion within the cavity, and the axis of the inner cavity is substantially parallel to the first axis, wherein the ear-canal aperture opens toward the ear canal of the user's ear when the earpiece device is worn by the user, and wherein the tip portion engages the concha of the user's ear when the earpiece device is worn by the user, and the axis of the tip portion is not parallel to the first axis.

2. The device according to claim 1, wherein the tip portion includes a compliant material and applies pressure at a first pressure point corresponding to a point on the inner side of the tragus of the user's ear and at a second pressure point corresponding to a point on the inner side of the antitragus of the user's ear, when the earpiece device is worn by the user.

3. The device according to claim 1, wherein an angle between the axis of the tip portion and the first axis is between about 65 to 40 degrees.

4. The device according to claim 1, wherein an angle between the axis of the tip portion and the first axis is between about 80 to 30 degrees.

5. The device according to claim 1, wherein the earpiece device is worn in the user's ear along a second axis, and an angle between the first axis and the second axis is about 20 to 50 degrees, and the second axis is substantially perpendicular to the axis of the tip portion of the removable ear interface.

6. The device according to claim 1, wherein the earpiece device is worn in the user's ear along a second axis, and an angle between the first axis and the second axis is about 10 to 60 degrees, and the second axis is substantially perpendicular to the axis of the tip portion of the removable ear interface.

7. The device according to claim 1, wherein the vibrating axis of the diaphragm of the acoustic driver, the nozzle portion of the housing, and the inner cavity of the cushion are substantially centered about the first axis.

8. The device according to claim 1, further comprising:

a wireless communication circuit; and a battery, wherein the wireless communication circuit and the battery are located substantially within the first chamber of the housing.

9. The device according to claim 8, wherein a center of mass of the earpiece device is at or close to the nozzle portion.

10. An earpiece device, comprising:

a sound delivery housing, the sound delivery housing including a first chamber and a nozzle portion, wherein the nozzle portion extends along a first axis and extends toward an ear canal of a user's ear when the earpiece device is worn by the user, wherein the first chamber is substantially parallel to the first axis, wherein the nozzle portion accommodates an acoustic driver therein; and a removable eartip, the removable eartip including an inner cavity, an ear-canal aperture and a tip portion, wherein the inner cavity of the eartip accommodates the nozzle portion within the cavity, and the axis of the inner cavity is substantially parallel to the first axis, wherein the ear-canal aperture opens toward the ear canal of the user's ear when the earpiece device is worn by the user, and wherein the tip portion engages the concha of the user's ear when the earpiece device is worn by the user, and the axis of the tip portion is not parallel to the first axis, wherein the acoustic driver includes a diaphragm, and is acoustically coupled to the first chamber of the housing and wherein a vibrating axis of the diaphragm is substantially along to the first axis.

11. The device according to claim 10, wherein the vibrating axis of the diaphragm of the acoustic driver, the nozzle portion of the housing, and the inner cavity of the removable eartip are substantially centered about the first axis.

12. The device according to claim 10, further comprising:

a wireless communication circuit; and a battery, wherein the wireless communication circuit and the battery are located substantially within the first chamber of the housing.

13. The device according to claim 12, wherein a center of mass of the earpiece device is at or close to the nozzle portion of the housing.

* * * * *